(12) United States Patent
Hayes

(10) Patent No.: US 6,557,305 B1
(45) Date of Patent: May 6, 2003

(54) WALL MOUNTING

(76) Inventor: Clifford J. Hayes, P.O. Box 421721, Del Rio, TX (US) 78842-1721

( * ) Notice: Subject to any disclaimer, the term of this patent is extended or adjusted under 35 U.S.C. 154(b) by 0 days.

(21) Appl. No.: 09/996,976

(22) Filed: Nov. 30, 2001

Related U.S. Application Data

(62) Division of application No. 09/336,978, filed on Jun. 21, 1999.

(51) Int. Cl.[7] ................................. E04H 14/00
(52) U.S. Cl. ............................... 52/27; 174/58
(58) Field of Search ................... 52/27; 174/58

(56) References Cited

U.S. PATENT DOCUMENTS

| | | | | |
|---|---|---|---|---|
| 5,064,386 A | * | 11/1991 | Dale et al. ................. | 439/535 |
| 5,736,674 A | * | 4/1998 | Gretz ........................ | 174/50 |
| 6,051,785 A | * | 4/2000 | Baldwin et al. ............ | 174/54 |
| 6,338,225 B1 | * | 1/2002 | Hayes ........................ | 52/27 |

* cited by examiner

Primary Examiner—Carl D. Friedman
Assistant Examiner—Steve Varner
(74) Attorney, Agent, or Firm—E. Richard Zamecki

(57) ABSTRACT

Apparatus in the form of a box unit or box assembly is disclosed for mounting in an opening in a wall wherein the apparatus is mounted from the front of the wall. A box body is positioned in the opening in the wall and anchored there to the wall by a flange located at least partly behind the wall and another flange in front of the wall. Embodiments of the present invention disclosed include electrical junction boxes.

2 Claims, 6 Drawing Sheets

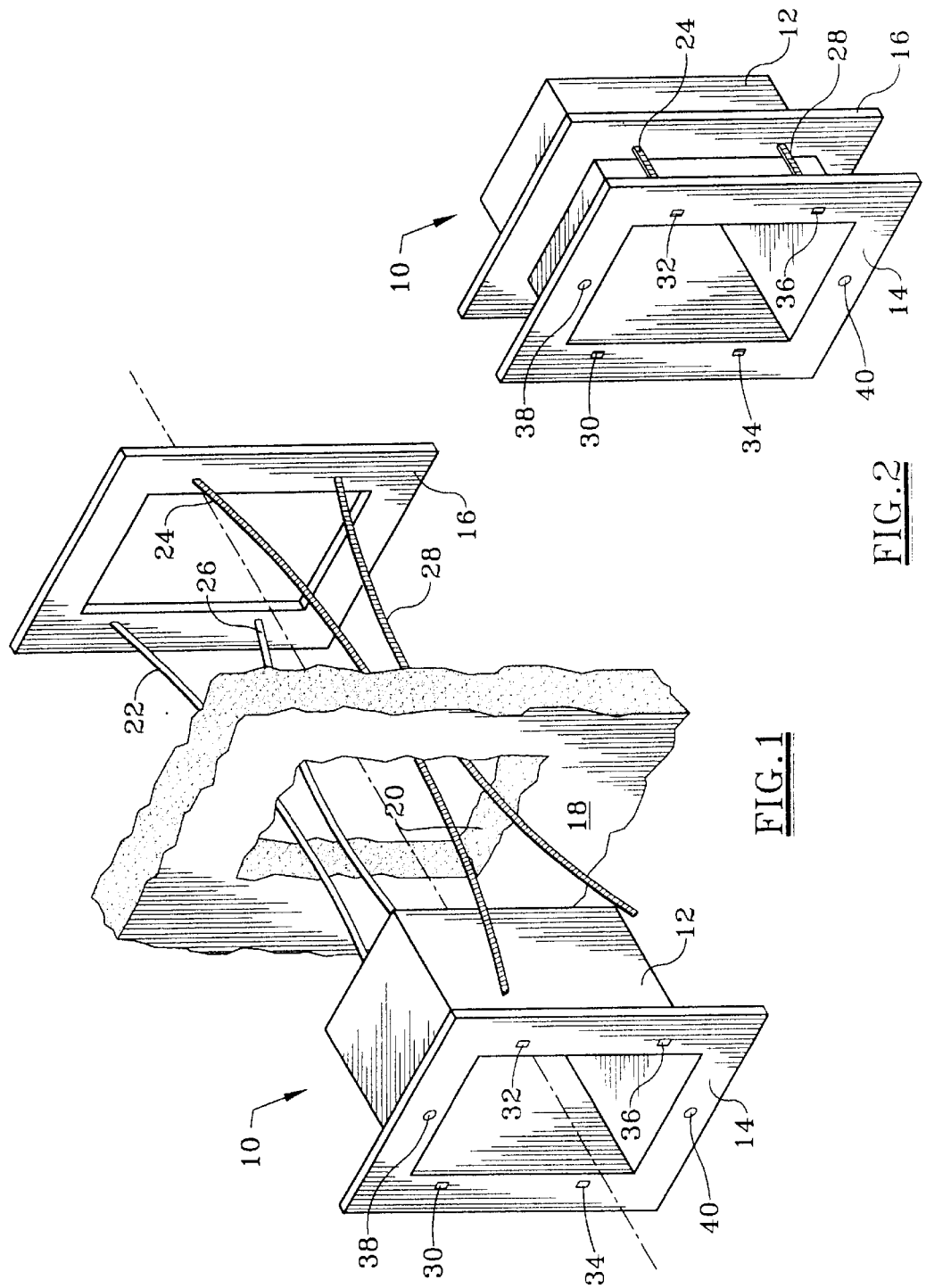

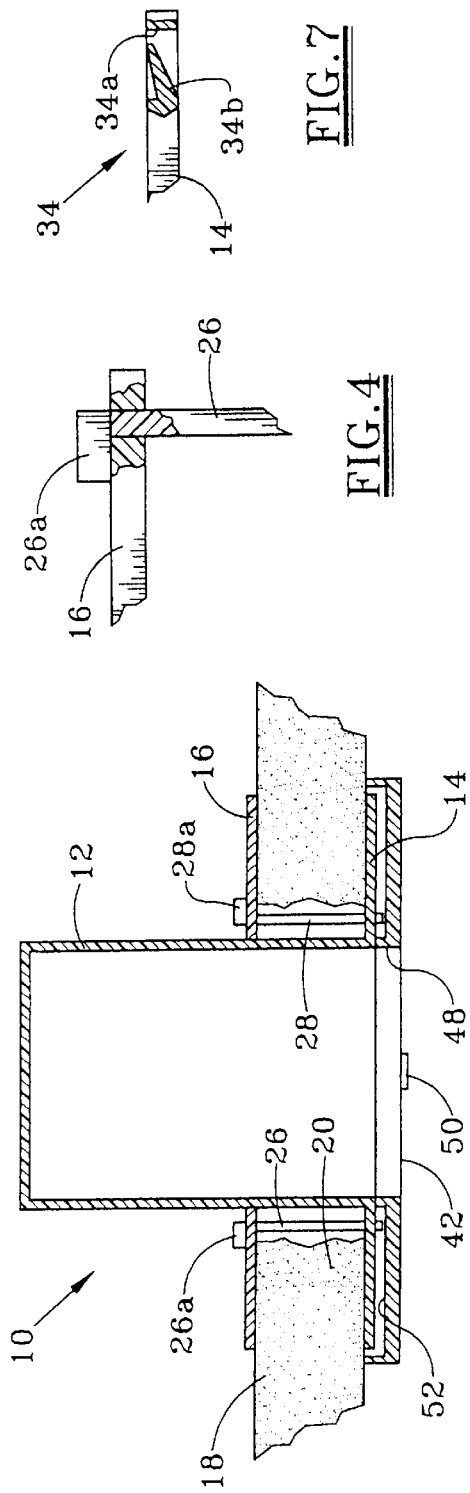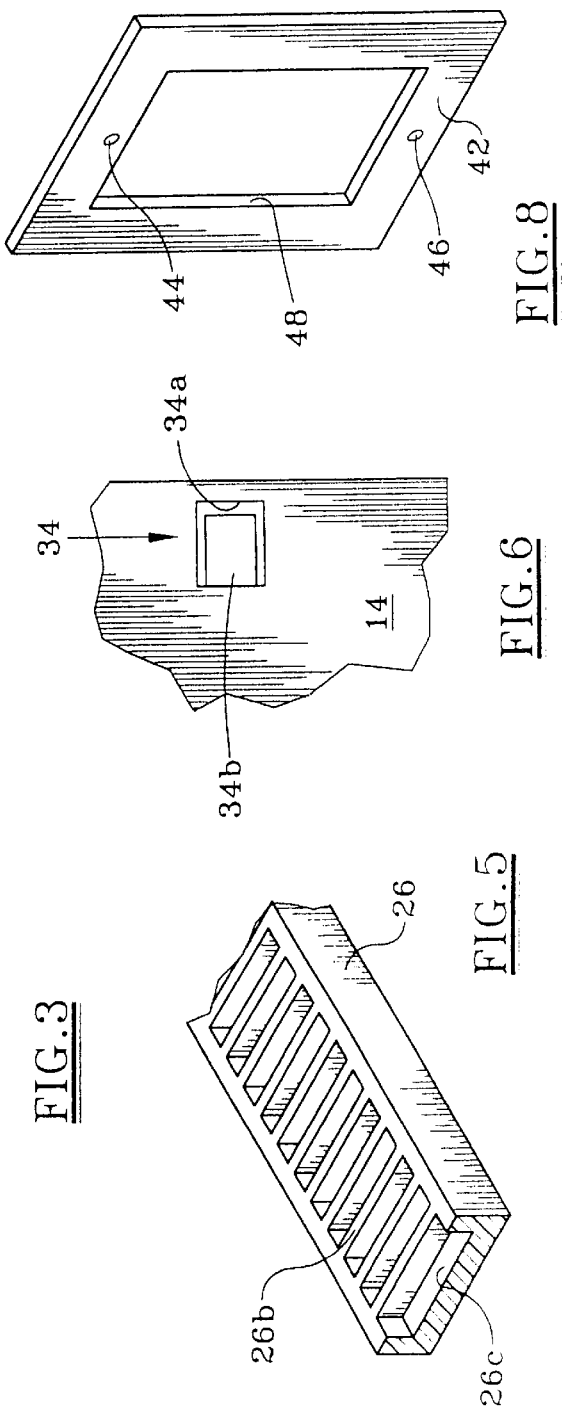

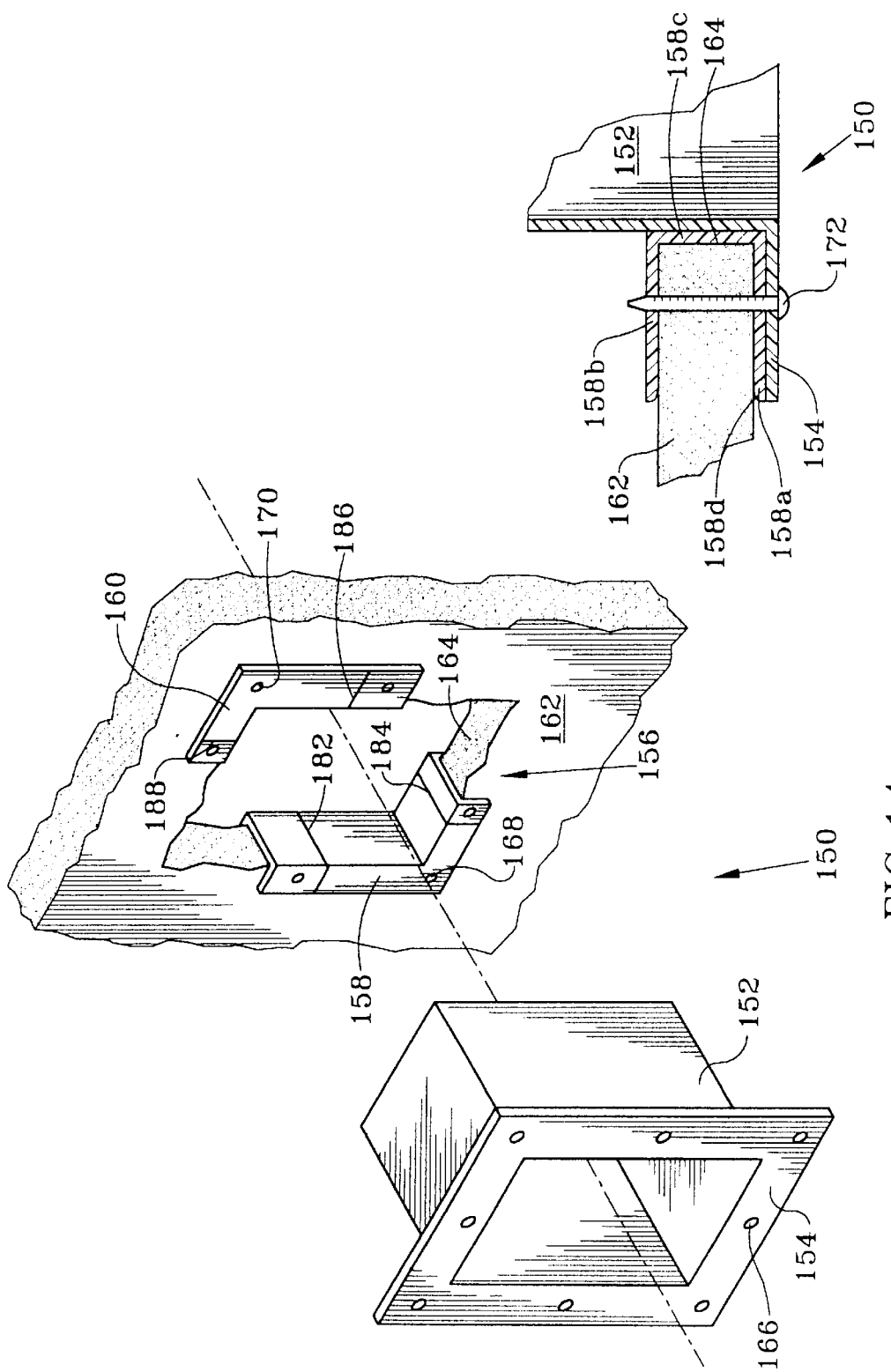

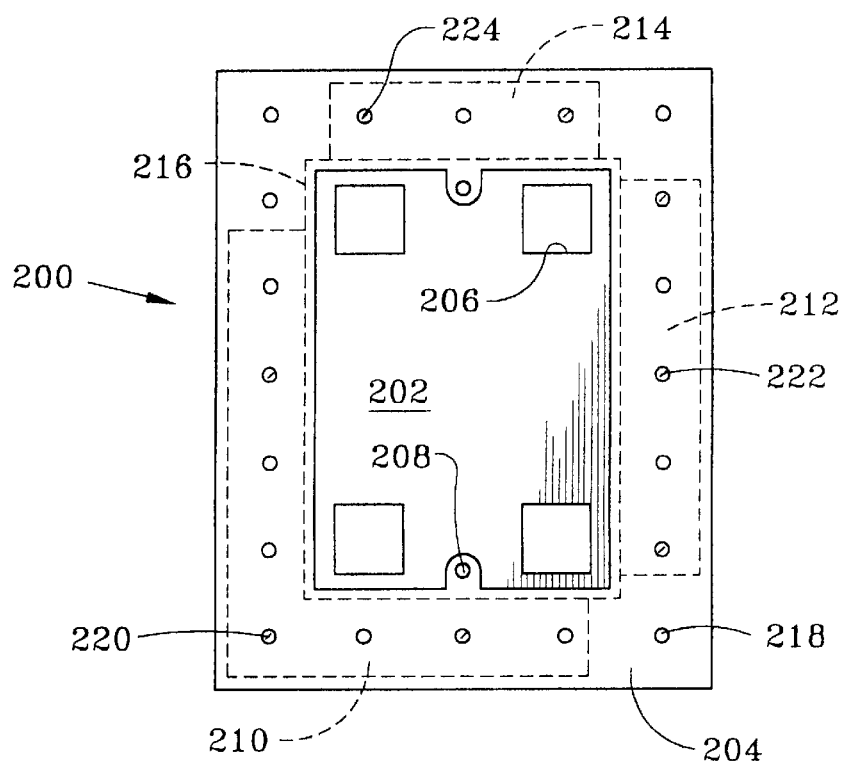
FIG. 18
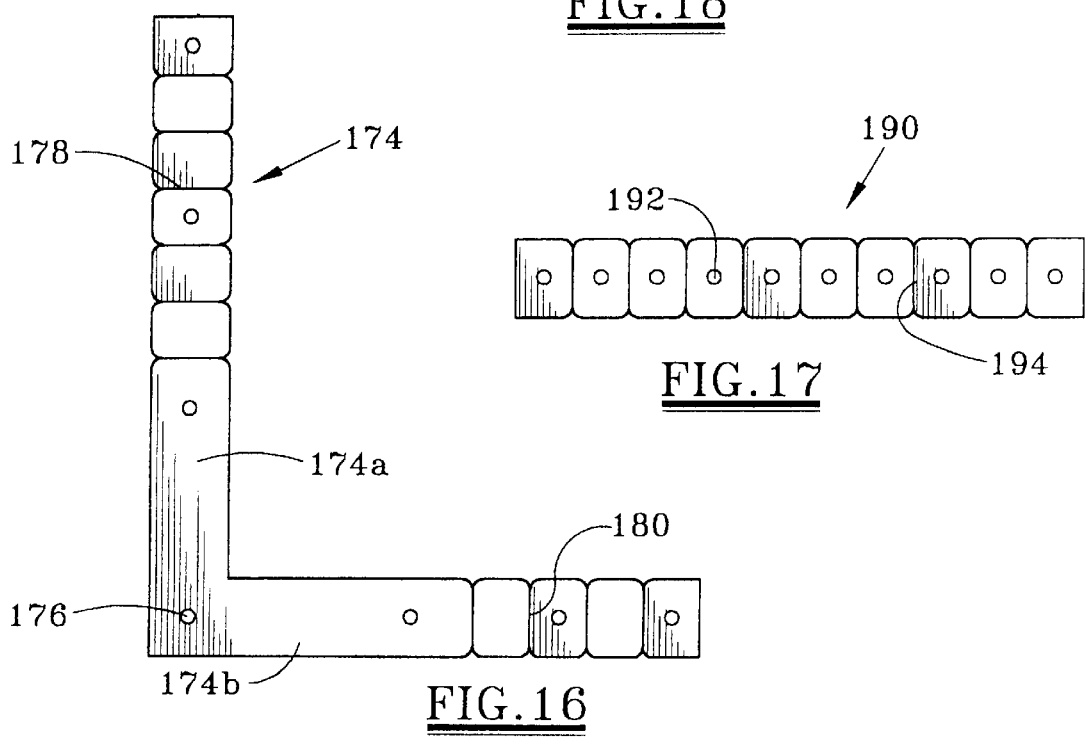
FIG. 17
FIG. 16

ND MOUNTING

The present application is a division of pending U.S. patent application Ser. No. 09/336,978, filed Jun. 21, 1999.

TECHNICAL FIELD

The present invention relates to techniques for mounting a unit or structure on a wall or the like. More particularly, the invention pertains to methods and apparatus for mounting frames, boxes or various other units, inset in openings in walls or partitions, for example, and finds particular application in revising or remodeling processes to inset structures in existing walls.

BACKGROUND OF THE INVENTION

In the construction or remodeling of a building, electrical wiring, such as for electrical service, cable service, telephone service, and computer networking, is preferably installed before the walls are finished, thus avoiding having to cut into finished wallboard or the like. Then various electrical junction boxes are installed, usually attached to wall studs, and the wiring introduced into the junction boxes through appropriate holes, including punch-out holes, in the backs or sides of the junction boxes. The appropriate electrical appliances, such as switches, receptacles, or other devices, are wired and mounted in the junction boxes. When wallboard, for example, is completed around a junction box, a finish plate may be attached to the front of the electrical appliance.

In situations where an electrical junction box is to be installed in a completed wall, a stud must be located behind the wall and a hole cut in the wall next to the stud. The hole must be large enough to pass the junction box through and allow an installer to attach the junction box to the stud, such as by nails, for example. Such an operation can leave a substantially large hole requiring significant patching and painting.

It is desirable and advantageous to provide a technique for mounting an electrical junction box in a wall without the need to locate a stud behind the wall in order to attach the junction box to the stud, and without the need to cut a hole substantially larger than the junction box. The present invention provides method and apparatus for achieving these advantages. Further, the present invention is not limited to the field of electrical junction boxes, or building walls. The present invention may be applied to any circumstance in general wherein a box of some kind is to be mounted in an opening in a wall or partition, for example, and is generally not limited in either size or shape of the box to be mounted, or to the function or purpose of the box.

The straps described below may be somewhat similar to available plastic strips for use in binding cables, or the like. Such a strip features a grip at one end of the strip, and lateral ridges along one side of the strip. In use, the strip may be wrapped around a bundle of cables and the end of the strip without the grip inserted into the grip and pulled tightly to tie up the cable bundle.

SUMMARY OF THE INVENTION

The present invention provides method and apparatus for mounting a box unit or assembly in an opening in a wall or the like. The box assembly may include a box body, a first flange, and a second flange. The first flange has at least one dimension, such as height or width, that extends beyond a corresponding transverse dimension of the box body, so that, with the first flange integral or attached to the box unit body, while the box unit body may fit into or through an opening in a wall, the first flange will not. When the second flange is in position, at least partly behind the wall, for the mounting of the box unit in the wall opening, the second flange effectively extends behind the wall beyond the box unit body. Thus, the first and second flanges each extends beyond the wall opening so that a portion of the wall at the opening is effectively sandwiched between the first and second flanges. One or more attachment devices are provided to connect the second flange to the first flange, directly, or indirectly by connecting one of the flanges to the box body to which the other flange is fixed, with the first flange extending on one side of the wall, the second flange extending on the other side of the wall, and the box unit body in the opening in the wall, to mount the box unit or assembly in the wall opening.

In a method of the invention the box unit body is positioned in the opening in the wall with the second flange at least partly behind the wall. The first flange is positioned on the front side of the wall generally toward the front of the box body and extending beyond at least one transverse dimension of the wall opening. The first flange and the second flange are connected together, directly or indirectly, to anchor the box unit or assembly to the wall with the first flange against the front surface of the wall and the second flange against the back surface of the wall.

One of the first or second flanges may be separate from the box body, and one of the flanges may be integral or joined to the box body. One or more attachments may be provided to so connect the first flange to the second flange. Such attachment devices may include elongate members, such as straps, carried by the second flange, for example, and corresponding receptacles carried by the first flange. The elongate members may be received and engaged by the receptacles to so connect the first flange and the second flange. Also, where the second flange is separate from the box body, the elongate members carried by the second flange may be used to manipulate the second flange behind the wall through the wall opening. Threaded connectors, such as screws, or nuts and bolts, may be used to connect the first flange and the second flange. Further, as an alternative, either elongate members or receptacles therefor may be carried by the box body; also, threaded connectors may be carried by the box body.

With the second flange integral or attached to the box body, the box body is inserted through the wall opening to behind the wall with the second flange, and the box body is then positioned in the wall opening with the second flange behind the wall. In the case of a separate second flange, the second flange may be inserted through the wall opening and manipulated behind the wall to be drawn over the back of the box body which is positioned in the wall opening. Elongate members carried by the second flange may be used to maneuver the second flange behind the wall.

The second flange may also be provided by a flange system comprising one or more flange members, with each flange member having a first side and a second side joined by a base such that the first side of the flange member may be positioned on one side of a wall and the second side of the flange member may be positioned on the other side of the wall with the base generally along the edge of the wall opening. With the one or more flange members so positioned, the box unit body may be inserted into the opening in the wall, keeping the flange members in place along the edge of the wall opening. Then the first flange, located generally toward the front of the box unit body, that is, on the front side of the wall, may be connected to the one or more flange members to anchor the box unit in the wall opening.

Box units or assemblies according to the present invention may include box bodies of various shapes and sizes, and for various purposes. As one example, a box assembly according to the present invention may be an electrical junction box to be mounted in a wall opening to house some electrical appliance that is connected to wires running behind the wall.

Although apparatus and method of the present invention may be described in terms of a box, or box unit, or box assembly, and two flanges that secure the box in an opening in a wall, and mounting a box, or box unit, or box assembly, in an opening in a wall using flanges, these descriptive terms are to be taken in their broad senses. For example, a wall as used herein may be anything that serves as a partition, or divider, between two separate spaces, such that space on one side of the wall may be so distinguished from space on the other side of the wall, and such that the wall has two surfaces that face the two spaces. As examples, a wall may be an actual side of a room in a building, including wallboard, gypsum board or the like, or may be a panel as part of a piece of equipment. Similarly, a box, or box unit, or box assembly, as used herein may include any structure, or body, defining a space, recess, or compartment, for example, and may have one or more continuous sides, or may be in the form of an open frame. As examples, a box body may be a rectangular parallelepiped with four sides and a bottom, or may be a cylindrical tube. One or more sides or ends of a box body may be open in whole or in part. Also, a flange as used herein may be any collar, rib, rim, wing, plate, framing, member, or plurality of members that is integral or joined to a box body, or that fits on, or cooperates with, a box body, to secure the box unit to a wall, and may circumscribe the box body in whole or in part, such as in the case of a collar or in the case of tabs or flange members spaced about the periphery of the box unit body. The examples used in this paragraph are provided for purposes of illustration and not limitation to emphasize the breadth of meaning to be given to the terms referred to. Finally, no limiting meaning is to be given to the terms "unit" and "assembly" as use herein; rather these terms are used in referring to the structure of the invention in general, taking into account that the invention includes parts which are connected together in mounting the structure in an opening in a wall.

The present invention thus provides apparatus and method whereby a box body is mounted in an opening in a wall, anchored there by a first flange against the front surface of the wall and a second flange against the back surface of the wall, with the two flanges connected together, and wherein the process of mounting the apparatus is carried out from in front of the wall, with the second flange able to be inserted through the wall opening.

BRIEF DESCRIPTION OF THE DRAWINGS

FIG. 1 is an isometric view of a box unit in one stage of being mounted in an opening in a wall according to the present invention, showing the wall broken away;

FIG. 2 is a view similar to FIG. 1, showing the box unit completely made up as it would be when mounted on the wall, but not showing the wall for purposes of clarity;

FIG. 3 is top, plan, sectional view of the box assembly of FIGS. 1 and 2 mounted in the opening in the wall, and with a finish panel added;

FIG. 4 is an enlarged, fragmentary top plan view in partial section of a portion of the rear collar of the box unit of FIGS. 1–3, showing detail of one of the straps used in mounting the box unit;

FIG. 5 is an enlarged fragmentary isometric view of a portion of the strap of FIG. 4;

FIG. 6 is an enlarged, fragmentary front elevation of a portion of the front flange of the box unit of FIGS. 1–3, showing detail of one of the receptacles for receiving the strap of FIGS. 4 and 5;

FIG. 7 an enlarged, fragmentary bottom plan view in partial section of a portion of the front flange of FIG. 6 showing further detail of the receptacle of FIG. 6;

FIG. 8 is an isometric view of the finish panel included in FIG. 3;

FIG. 14 is an isometric view of another version of a box unit in the process of being mounted in an opening in a wall according to the present invention, showing the wall broken away;

FIG. 15 is a top, plan, sectional fragmentary view of the box assembly of FIG. 14 mounted in the opening of the wall, showing detail of the attachment of the box unit body to one of the flange members;

FIG. 16 is a side elevation of one type of flange member according to the present invention;

FIG. 17 is a side elevation of another type of flange member according to the present invention; and FIG. 18 is a front elevation of an electrical junction box mounted in an opening in a wall (not shown) according to the present invention, including flange members of the types shown in FIGS. 16 and 17.

DETAILED DESCRIPTION OF THE INVENTION

Figure 11:
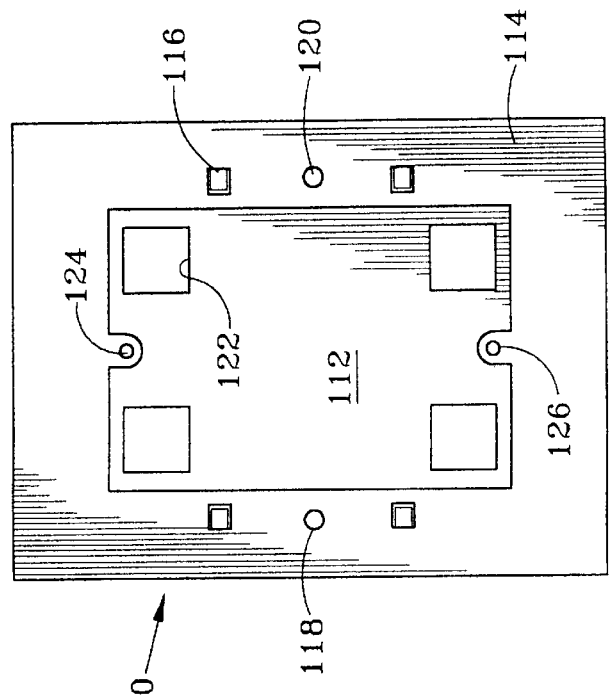
FIG. 11 is a front elevation of an electrical junction box for mounting in an opening in a wall according to the present invention.

The present invention is illustrated and described in several presently preferred embodiments.

A box unit, or box assembly, according to the present invention is shown generally at 10 in FIGS. 1–3. The box unit 10 includes a rectangular parallelepiped body 12 having an open front that is circumscribed by a rectangular first, front flange 14 which is integral with the body, and a separate rectangular second, rear flange, or collar, 16. The rear collar 16 is separated from the box unit body 12 in FIG. 1, but is joined to the body in FIGS. 2 and 3. In FIG. 1 the collar 16 is shown behind a wall 18, having been passed through an opening 20 in the wall, and the box unit body 12 is shown generally aligned with, and facing away from, the opening. Four elongate members in the form of straps 22, 24, 26, and 28 extend through the wall opening 20 from spaced-apart positions about the front of the rear collar 16 facing the box unit body 12 in FIG. 1. The front flange 14 is fitted with four receptacles 30, 32, 34, and 36 likewise spaced apart about the open front of the body 12 for receiving the straps 22, 24, 26, and 28, respectively.

The rear collar 16 may be pulled over the box unit body 12 as indicated in FIGS. 2 and 3, and the straps 22–28 put through the respective receptacles 30–36. Then, each of the straps 22–28 is anchored by a corresponding receptacle 30–36, thus firmly anchoring the rear collar 16 to the box unit body 12.

The wall opening 20 is large enough to receive the box unit body 12 of the box unit 10, but is smaller in both length and width than the length and width, respectively, of the front flange 14. Likewise, the length and width of the rear collar 16, which may be the same length and width, respectively, of the front flange 14, are larger than the length and width, respectively, of the wall opening 20. Consequently, when the box unit body 12 is positioned within the wall opening 20 and the rear collar 16 is pulled over the body and anchored thereto by the straps 22–28 being anchored by the receptacles 30–36 of the front flange 14, the box unit 10 is mounted on the wall 18 and held there by the cooperation of the front flange located against the front surface of the wall and the rear collar located against the rear surface of the wall, as shown in FIG. 3.

The straps 22–28 are generally elongate strips of a plastic material, and are used not just for anchoring the rear collar 16, but also for manipulating the collar behind the wall 18, and pulling the collar over the box unit body 12. After the straps 22–28 are pulled through the corresponding receptacles 30–36, the straps may be trimmed so that no amount of strap beyond that needed to secure the straps in the receptacles protrudes from the front of the box unit 10 mounted in the wall opening 20, as indicated in FIGS. 2 and 3.

Construction and operation of the straps 22–28 and receptacles 30–36 may be further appreciated by reference to FIGS. 4–7. Although only one strap 26 and the corresponding receptacle 34 are illustrated in FIGS. 4–7, the remaining straps 22, 24 and 28 and receptacles 30, 32 and 36, respectively, are of like construction and operation. FIG. 4 shows the strap 26 extending through a hole in the rear collar 16, and held there by a strap head 26a, formed on the end of the strap and too large to pass through the hole. FIG. 5 shows a segment of the strap 26, disclosing that the strap is rectangular in lateral section, and has lateral ridges 26b along one side. The ridges 26b are formed by indents, or grooves, 26c cut or otherwise formed along the side of the strap, the material between adjacent grooves making a ridge. The receptacle shown generally at 34 in FIGS. 6 and 7 includes an opening 34a in the front flange 14, with a catch, or tang, 34b extending into the opening. The catch 34b is thinner than the rest of the flange 14, generally wedge-shaped, and slanted, as seen in FIG. 7. It will be appreciated that, due to its shape, the catch 34b can flex upwardly as seen in FIG. 7, but cannot flex downwardly any significant amount.

In operation, the strap 26 is directed through the receptacle opening 34a upwardly as seen in FIG. 7, and from behind the drawing sheet as seen in FIG. 6. The strap 26 is oriented with its ridges 26b facing the catch 34b as the strap is so directed through the receptacle opening 34a. The catch 34b is sized and positioned to allow the strap 26 to pass through the receptacle opening 34a by the catch flexing upwardly (as seen in FIG. 7) to ride over the edges of the strap ridges 26b. After passing a strap ridge 26b, the receptacle catch 34b resides in the groove 26c between the ridge just passed and the next adjacent ridge. Any movement of the strap 26 in the opposite direction to withdraw the strap from the receptacle 34 is resisted by the catch 34b remaining relatively ridged and blocking the last-passed strap ridge 26b. Thus, the strap 26 so received by the receptacle 34 is prevented from being withdrawn from the receptacle.

In FIG. 2 the straps 22–28 are shown drawn through the receptacles 30–36, respectively, to anchor the rear collar 16 to the front flange 14, and, therefore, to the box unit body 12. FIG. 3 shows the same configuration of the box unit 10 as shown in FIG. 2, but also shows the position of the box unit as mounted in the opening 20 of the wall 18 by the cooperation of the rear collar 16 being fixed to the front flange 14 by the straps 26 and 28 being anchored in the receptacles 34 and 36, respectively, with the front flange positioned against the front surface of the wall and the rear collar positioned against the back surface of the wall (the remaining straps 22 and 24 being anchored in the receptacles 30 and 32, respectively, and not being visible in FIG. 3). The portion of the straps 22–28 that extend beyond the receptacles 30–36, respectively, have been trimmed off as seen in FIG. 2, leaving just stubs of the straps in front of the flange 14, as indicated in FIG. 3 with respect to the two lower straps 24 and 26. The strap head 28a is also visible in FIG. 3, securing strap 28 to the rear collar 16. It will be appreciated from the discussion above that the straps 22–28 as shown in FIGS. 2 and 3 are oriented with their respective ridged sides facing away from the box unit body 12 so that their respective ridges engage the catches of the respective receptacles 30–36.

Depending on the nature and purpose of the box unit 10 of FIGS. 1–3, a finish panel, or plate, may be added to dress the front of the box unit as mounted in the wall 18, for example. Provision may be made to join such a finish piece to the mounted box unit. To this end, holes 38 and 40 are provided in the front flange 14 to receive screws or other attachment devices.

FIG. 8 illustrates a finish panel 42 in the general form of a frame having an opening 48 and two holes 44 and 46. In FIG. 3, the finish panel 42 is attached to the front of the box unit 10 with the panel opening 48 aligned with the open front of the box unit body 12. In that configuration, the finish panel holes 44 and 46 are aligned with the front flange holes 38 and 40, respectively, so that screws pass through the panel holes and tap into the flange holes to anchor the panel 42 to the box unit 10. One such screw 50 is shown in FIG. 3, passing through the lower panel hole 46 and engaging the flange at its lower hole 40 (not visible). The back of the finish panel 42 is structured with a groove, or recess, 52 to accommodate the stubs of the straps 22–28 extending beyond the front surface of the flange 14. The groove 52 may circumscribe the panel opening 48, or may be provided in one or more separate segments with each segment positioned to receive one or more of the stubs of the straps 22–28.

The front flange 14 may, as an alternative, be attached to the front of the box unit body 12 by screws or other appropriate fasteners rather than being integral to the box unit body.

Other mechanisms may be employed in place of, or in addition to, straps and receptacles to secure a box unit mounted in a wall opening according to the present invention. For example, threaded connectors, such as nuts and bolts, or self-tapping screws, may be so used. A box unit, or box assembly, shown generally at 60 in FIG. 9 includes a body 62 having an attached, or integral, first, front flange 64 and a second, rear collar 66 that is first inserted through an opening in a wall (not shown) on which the box unit is to be mounted. The rear collar 66 is then pulled over the end of the box unit body 62 as the latter is positioned in the wall opening, and the rear collar is secured to the front flange 64 to anchor the box unit 60 to the wall. Straps (not shown) may be used to manipulate the collar 66, as discussed above regarding the process of mounting the box unit 10 shown in FIGS. 1–3.

Threaded connectors are used to secure the rear collar 66 to the front flange 64. Two such threaded connectors are visible in FIG. 9, and comprise bolts 68 and 70 passing through appropriate holes in the front flange 64 and being received and threaded in nuts 72 and 74, respectively, fixed to the rear collar 66. Additionally, straps (not shown) carried by the rear collar 66 may be received by receptacles (not shown) as parts of the front flange 64 as in the case of the box unit 10 of FIGS. 1–3. Alternatively, after the rear collar 66 has been manipulated over the box unit body 62, and the threaded connections between the bolts 68 and 70, and the nuts 72 and 74, respectively, have been started, the straps may simply be trimmed and not relied upon to contribute to the anchoring of the rear collar to the front flange 64. Also, rather than bolts 68 and 70, and nuts 72 and 74, self-tapping screws may be passed through appropriate holes in the front flange 64 and received in pilot holes in the rear collar 66, wherein the screws are then threadedly engaged to the rear collar to anchor the rear collar to the front flange. The rear collar 66 may be constructed sufficiently thick, at least where the pilot holes are positioned, to allow multiple turns in the threading of the pilot holes by the screws to so anchor the rear collar to the front flange 64.

Again, as an alternative, the front flange 64 may be joined to the box unit body 62 by screws or other appropriate connectors rather than being integral to the box unit body.

Figure 10:
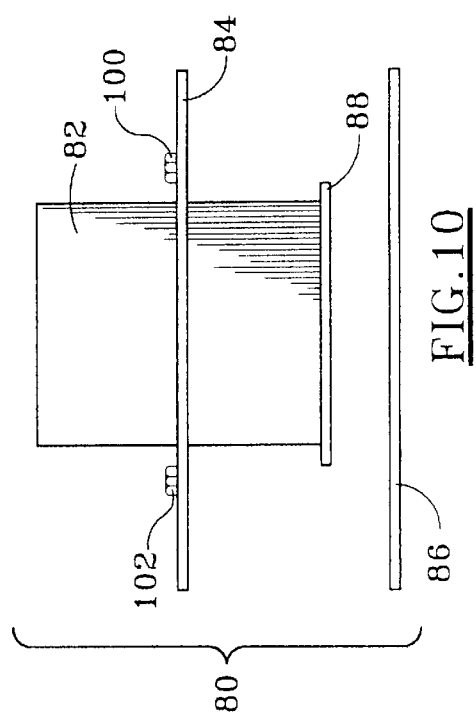
FIG. 10 is a top plan view of a version of a box unit for mounting in an opening in a wall according to the present invention, wherein a rear flange of the box unit is fixed, or integral, to the body of the box unit.

A variation of a box unit or assembly according to the present invention is shown generally at 80 in FIG. 10, and includes a body 82 equipped with a rear collar, or flange, 84 that is either integral to the body or attached thereto, and a front flange 86 that is not integral to the body. In practice, the box unit body 82, with the rear flange 84, is oriented sideways and end-on relative to the wall opening (not shown) in which the box unit 80 is to be mounted, and inserted through the opening. Then, the box unit body 82 is turned and positioned with its open front end toward the wall opening and drawn outwardly until the rear flange 84 is against the back surface of the wall, just as in the case of the rear collar 16 as shown in FIG. 3.

It will be appreciated that the depth of the box unit body 82 and possibly the width of the rear flange 84 may be limited by the width of the wall opening, for example, to allow the box unit body and rear collar to be so inserted through the wall opening. For example, making the wall opening at least as wide as the box unit body 82 is deep, and at least as long as the rear flange 84 is wide, will insure the capability of passing the box unit body and rear flange through the wall opening. It will also be appreciated that the box unit body 82 may be so inserted through the wall opening and manipulated as described above by hand, possibly using a grasping tool such as pliers, without using straps as described above in the case of the box unit 10 of FIGS. 1–3. Alternatively, straps (not shown) may be attached to the box unit body 82 to assist in the manipulation of the box unit body behind the wall.

Figure 9:
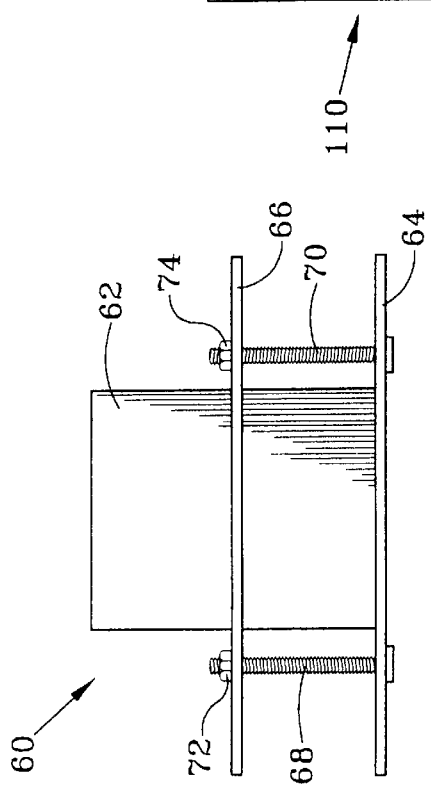
FIG. 9 is a top plan view of another version of a box unit for mounting in an opening in a wall according to the present invention, employing threaded connectors.

The front flange 86 may be in the form of a frame with an interior opening, such as the front flange 14 shown in FIGS. 1–3. When the box unit body 82 and rear collar 84 are positioned in the wall opening for mounting, the front flange 86 is positioned against the front of the box unit body, and attached to the rear collar by threaded connectors, for example. Appropriate holes (not shown) are provided through the front flange 86 to permit the passage of bolts, for example, which are then received by and threadedly connected to nuts 100 and 102, carried by the rear collar 84, in the same manner in which the rear collar 66 is shown joined to the front flange 64 by threaded connectors 68–74 in the case of the box unit 60 as shown in FIG. 9. Again, as discussed above in the case of the box unit 60 shown in FIG. 9, self-tapping screws and pilot holes may used to join the front flange 86 and the rear collar 84 of the box unit 80 shown in FIG. 10.

A lip 88 may circumscribe, in whole or in part, the front of the box unit body 82 to provide added surface against which the front flange 86 is positioned. It will be appreciated that the distance between the front flange 86 and the rear collar 84, when these two parts are connected together, will be determined by the position of the rear collar on the box unit body 82. Consequently, the distance from the front of the box unit body 82 to the rear flange 84 may determine the thickness of the wall on which the box unit may be selected to be mounted. Alternatively, the box unit body 82 may be constructed without the lip 88, and the interior opening (not shown) through the center of the front flange 86 may be large enough that the flange may be slipped over the box unit body and then anchored to the rear flange 84, with the front of the box unit body protruding through the front flange interior opening. If desired, the protruding front of the box unit body 82 may be trimmed, or covered with a finish plate such as the plate 42 shown in FIG. 4, for example, secured either to the front flange 86 or to the box unit body.

Again, if straps are included in the box unit 80, they may be either combined with receptacles (not shown) carried as parts of the front flange 86 to secure, in whole or in part, the front flange to the rear flange 84, or hidden in the wall opening, or trimmed after the box unit body 82 is positioned within the wall opening for mounting.

An electrical junction box according to the present invention is shown generally at 10 in FIG. 11. The junction box 110 includes a box body 112, a front flange 114 and a rear flange, or collar, that is not visible in FIG. 11. In general, the junction box 110 may be constructed similar to any of the box units 10, 60, or 80 described above, and is mounted in a wall opening as described above in relation to the respective box unit constructions. Thus, the front flange 114 may be integral or attached to the box body 112, and the back collar may be separate from the box body, as in the cases of the box units 10 and 60. Alternatively, the back collar of the junction box may be integral or attached to the box body 112, and the front flange 114 may be separate from the box body, as in the case of the box unit 80.

As shown in FIG. 11, the front flange 114 is equipped with four receptacles 116, a illustrated in FIGS. 6 and 7, for receiving and anchoring four straps (not shown), as illustrated in FIGS. 4 and 5, for use in manipulating and anchoring the back collar (not shown). Two holes 118 and 120 pass through the front flange 114 to accommodate two bolts or screws, for example, to be received in holes in the back collar for joining the back collar and the front flange, as in the case of the box unit 60 of FIG. 9, for example.

The junction box 110 mounted in a wall opening may receive and house an electrical appliance such as a switch, or one or more sockets, for example. One or more holes 122, (four are shown) in the box body 112 allow electrical wiring behind the wall to be passed into the box body for connecting to any electrical appliance. Threaded holes 124 and 126 are provided in the front of the box body 112 to receive bolts for attaching and anchoring an electrical appliance to the junction box. A finish panel may be applied to the electrical appliance so fixed to the junction box, with the finish plate covering the front flange 114.

Figure 12:
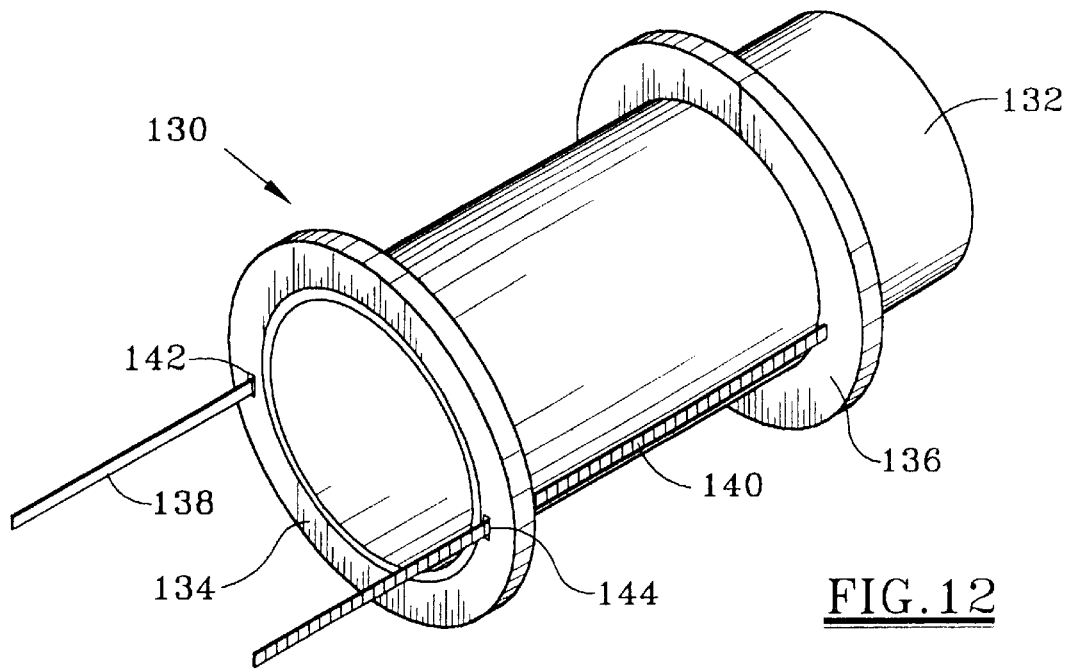
FIG. 12 is an isometric view of a cylindrical box unit for mounting in an opening in a wall according to the present invention, showing straps holding the rear collar on the body of the box unit.

The present invention is not limited to box units that feature bodies that are rectangular parallelepipeds; other shapes may be employed for the box unit bodies. A box unit, or box assembly, according to the present invention is shown generally at 130 in FIG. 12, and features a right circular cylindrical box unit body 132. A front flange 134 in the form of a generally planar ring is integral, or attached, to the box unit body 132 at its open front end. A rear collar 136 is in the form of a generally planar ring, and is fitted with two straps 138 and 144 for use in manipulating the collar through a wall opening as described above concerning the mounting of the box unit 10 of FIGS. 1–3. Also, the front flange 134 has two receptacles 142 and 144 for receiving the straps 138 and 140, and securing the back collar to the front flange.

Figure 13:
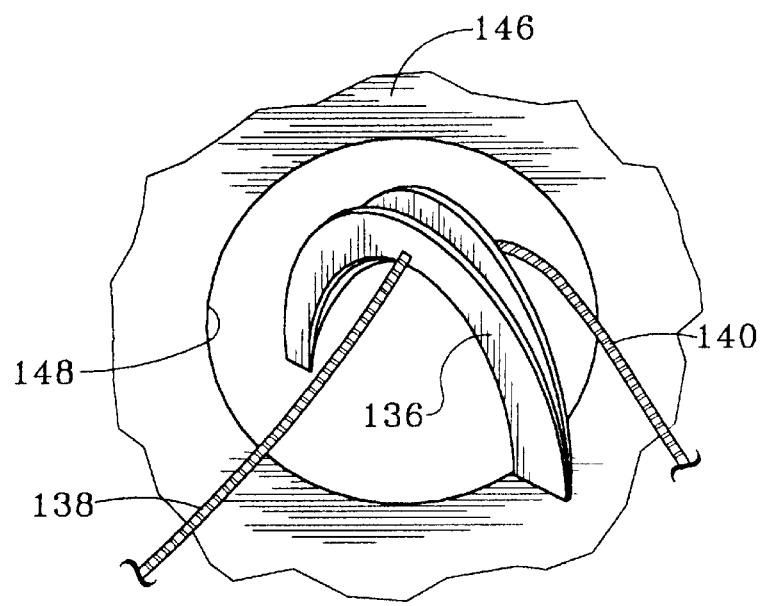
FIG. 13 is a front elevation of a portion of a wall having a circular opening, showing how the rear collar may be inserted through the opening in the process of mounting the cylindrical box unit of FIG. 12.

The cylindrical box unit 130 may be mounted in a generally circular opening in a wall. FIG. 13 shows a portion of a wall 146 with a circular opening 148, in which the box unit 130 might be mounted. Since the rear collar 136 must be larger in diameter than the circular opening 148, the collar 136 must be folded to be inserted through the wall opening in one piece, as illustrated in FIG. 13. The rear collar 136 is moved through the opening 148 to behind the wall 146 while the straps 138 and 140 remain extending through the opening. Then the rear collar 136 may be manipulated through the opening 148 by use of the straps 138 and 140, whereby the collar may be pulled onto the cylindrical box unit body 132 as the latter is moved into the wall opening.

If desired, threaded connectors (not shown) may be applied to anchor the box unit 130 in the wall opening 148 in addition to the straps 138 and 140, and the receptacles 142 and 144, as discussed above and illustrated in FIG. 9 in connection with the box unit 60. Also, a finish plate (not shown) may be added to the mounted box unit 130 as discussed above and illustrated in FIGS. 3 and 4 in connection with the box unit 10.

Another version of a box unit, or box assembly, according to the present invention is shown generally at 150 in FIG. 14, and features a rectangular parallelepiped box unit body 152. The box unit body 152 has an open front surrounded by a flange, or lip, 154. The box unit assembly 150 also includes a flange member system 156, comprising two flange members 158 and 160.

FIG. 14 also shows a portion of a wall 162 with a rectangular opening 164 in which the box unit 150 is to be mounted. The two flange members 158 and 160 combine to line a portion of the wall opening 164. FIG. 15 shows some detail of the arrangement of one of the flange members 158 with the wall 162 and the box unit body 152 when the box unit assembly 150 is mounted in the wall opening 164 according to the present invention.

The construction and function of the flange member system 156 may be appreciate by reference to FIGS. 14 and 15 from which it can be appreciated that each of the flange members 158 and 160 has a "U" shape in lateral cross section, as in the case of a channel beam, or U-tube, or U-channel, and is further provided in the form of an "L" with the open side of the channel facing outwardly relative to the L-shape. In FIG. 15 one side of the channel of the flange member 158 is identified at 158a, the other side of the channel is identified at 158b, and the base of the channel which joins the two sides is identified at 158c. The width of the channel base 158c matches the width, or thickness, of the wall 162 so that the flange member 158 just slips onto the wall at the opening 164, with the flange member front side 158a positioned against the front side of the wall, the flange member rear side 158b positioned against the rear side of the wall, and the base along the edge of the wall opening. The second flange member 160 also fits about the edge of the wall 162 at the opening 164, as shown in FIG. 14. The interior edges of the sides of the flange members 158 and 160 may be widened by being curved, or flared, for example, as indicated at 158d in FIG. 15, to facilitate placing the flange members onto the wall 162 at the opening 164.

In the process of mounting the box assembly 150 in the wall opening 164, the two flange members 158 and 160 are arrayed at opposite corners of the wall opening as shown in FIG. 14, and the box unit body 152 is moved into the wall opening between the flange members. The fit of the box assembly 150 in the wall opening 164 is such that the box unit body 152 maintains the flange members 158 and 160 against the edges of the opening, and the flange members are fixed against movement out of the wall opening by the fact that their respective front and rear channel sides are on opposite sides of the wall 162.

The front lip 154 of the box unit body 152 has a plurality of holes 166 arrayed about the lip. The flange member 158 has one or more pilot holes 168, and the second flange member 160 also has one or more pilot holes 170. The flange member pilot holes 168 and 170 are preferably provided in the rear channel sides as well as the front channel sides. Further, at least one of the pilot holes 168 and 170 on each of the flange members 158 and 160, respectively, are aligned with corresponding holes 166 of the box unit body lip 154 when the box unit body 152 is positioned in the wall opening 164 between the flange members. Then, as indicated in FIG. 15, screws 172 are inserted through the lip holes 166 and passed through the flange member holes 168 and 170, tapping the latter holes to anchor the box unit body 152 to the flange members 158 and 160. The screws 172 pass into the wall 162 and preferably extend to the pilot holes in the rear channel sides of the flange members, as shown in FIG. 15 in the case of the flange member 158. With the box unit body 152 thus secured to the flange members 158 and 160 by the screws 172 connecting the flange 154 with the two flange members, and the flange members locked against the edge of the wall opening 164 by the box unit body fitted between the flange members, the box assembly 150 is anchored to the wall 162 in the wall opening.

As noted above, the width of the bases of the channel beams formed as flange members such as 158 and 160 in FIGS. 14 and 15 are such that the flange members fit on the edges of the wall opening such as 164. It will be appreciated that flange members according to the present invention may be provided with different channel base sizes to so fit on the edges of walls of different thickness. For example, flange members may be provided with channel base sizes to fit wallboard that is one-half inch thick, five-eighths inch thick, or three-quarter inch thick. Likewise, flange members according to the present invention may be provided in different lengths to fit within the peripheries of different sizes of wall openings. Further, flange members according to the present invention may be provided that are variable in length.

An L-shaped flange member according to the present invention is shown from one side generally at 174 in FIG.

16, having a longer leg 174a and a shorter leg 174b, and being of the same general U-channel construction as the flange members 158 and 160 in FIGS. 14 and 15. An array of pilot holes (seven are shown) 176 are present on the visible side of the flange member 174, and are aligned with like pilot holes on the other side of the flange member hidden in FIG. 16. The pilot holes 176 receive and are tapped by self-tapping screws in anchoring a box unit body to a wall as in the case of the pilot holes 168 and 170 of the flange members 158 and 160, respectively, in FIG. 14. The flange member 174 is also equipped with break points in the form of grooves, crimps, or scouring, including break points 178 along the longer leg 174a, and break points 180 along the shorter leg 174b. The break points 178 and 180 may be arranged at regularly spaced locations, as shown, or in some other spacing, and serve to facilitate the cutting, breaking, or snapping, of the flange member legs to make them shorter where needed to fit within the periphery of a wall opening.

In FIG. 14, the flange member 158 is shown with two break points 182 and 184, and the flange member 160 is shown with two break points 186 and 188. Either leg of each of the two flange members 158 and 160 may have been shortened by removing additional material from the leg or legs at break points to fit the flange members within the wall opening 164, for example.

Flange members such as 174 in FIG. 16 may be made of metal, plastic, or any other material suitable for the particular application of the flange members. Accordingly, the act of shortening a leg of such a flange member can be carried out by breaking the leg at a break point by hand or with the use of pliers or the like, or the flange member leg may be cut at a break point with a knife or saw or the like. Thus, a flange member may be sized with legs of suitable lengths to fit any opening.

Another version of a flange member according to the present invention is shown from one side generally at 190 in FIG. 17. The flange member 190 is constructed in the form of a U-channel as in the case of the flange members 158, 160, and 174 described above, but is straight rather than L-shaped.

The flange member 190 is also equipped with an array of pilot holes 192, being located on both sides of the flange member, which receive self-tapping screws to hold a box unit body to the flange member and, therefore, a wall, as illustrated in FIG. 15 in the case of the flange member 158. Break points 194 are distributed at regular intervals along the length of the flange member 190 to allow the flange member to be shortened to any of a variety of lengths to fit a wall opening.

Another version of an electrical junction box according to the present invention is shown generally at 200 in FIG. 18. The junction box 200 includes a box body 202, a front flange, or lip, 204, four holes 206 in the back of the box body for electrical wiring behind a wall to be passed through into the box body for connecting to an electrical appliance, and two threaded holes 208 in the front of the box body to receive bolts for attaching and anchoring an electrical appliance to the junction box.

The junction box 200 includes a flange member system, in the case illustrated comprising three flange members 210, 212, and 214, shown in phantom in FIG. 18 behind the front lip 204 and positioned against the sides 216 of the box body 202, which are also shown in phantom behind the front lip 204. As illustrated, the junction box 200 is mounted within a wall opening (not indicated), with the flange members 210–214 lining edges of the wall opening, and with the box body 202 positioned among the flange members so that the box body sides 216 are against the flange members and hold the flange members against the wall opening edges. The front lip, or flange, 204 of the box body 202 features an array of holes 218 which align with pilot holes (not visible) in the flange members 210–214. Three screws 220 are received by the lip holes 218 and are threaded into pilot holes in the flange member 210, three screws 222 are received by the lip holes and are threaded into pilot holes in the flange member 212, and two screws 224 are received by the lip holes and are threaded into pilot holes in the flange member 214. Thus, the box body lip 204 at the front of the box body 202 is connected to the flange members 210–214 and, therefore, the junction box 200 is anchored to the wall (not shown). A finish panel may be applied to the electrical appliance to be located in the junction box 200.

The flange member system included in the electrical junction box 200 comprises one L-shaped flange member 210 and two straight flange members 212 and 214. Any combination of straight flange members may be used in a given application, along with or in place of one or more L-shaped flange members, with the flange members shortened as necessary to achieve a fit of the flange members about the periphery of the wall opening.

Generally, any number of flange members may be used in a flange member system for mounting a box unit according to the present invention. It may be preferable for a given application to use multiple L-shaped flange members to fit in the corners of a rectangular wall opening, or to use straight flange members such as flange member 190 in FIG. 17 positioned along the four straight edges of such a wall opening, or to use a combination of straight and L-shaped flange members as illustrated in FIG. 18, for example. Similarly, any number of screws may be used to connect the flange toward the front of the box unit body to the flange member or flange members as needed. The box unit body front flange must be equipped with holes to receive screws in appropriate locations, such as at corners or along the sides of the front flange, to align with pilot holes in the flange members as used.

While straps and receptacles for receiving and anchoring the straps have been disclosed herein for use in manipulating and mounting box assemblies according to the present invention, other devices, such a cables or wires, and corresponding receptacles for receiving and anchoring such devices, may be used alternatively. Also, while receptacles have been described and illustrated herein as being carried by, or as parts of, front flanges, such receptacles may also be carried by, or form parts of, box unit bodies. Further, threaded connectors may be received through holes in tabs, for example, at the front of a box body to be threadedly connected to a rear flange in anchoring the box assembly in a wall opening, wherein the rear flange is then indirectly connected to the flange at the front of the box body.

The present invention thus provides apparatus and method whereby a box body is mounted in an opening in a wall, anchored there by a first flange in front of the wall and a second flange at least partly behind the wall, with the two flanges connected together, and wherein the process of mounting the apparatus is carried out from in front of the wall, with the second flange able to be inserted through the wall opening.

The foregoing disclosure and description of the invention is illustrative and explanatory thereof, and various changes in the method steps as well as the details of the apparatus may be made within the scope of the appended claims without departing from the spirit of the invention.

What is claimed is:

1. A box unit for mounting in an opening in a wall, comprising:
   a. a box unit body;
   b. a first flange located generally toward the front of the box unit body; and
   c. a flange member system comprising at least one flange member having a first side and a second side joined by a base such that the first side of the flange member can be positioned on one side of such a wall and the second side of the flange member can be positioned on the other side of the wall with the base generally along the edge of the wall opening, and the first flange can be attached to the flange member by at least one attachment device with the box unit body in the opening in the wall.

2. A method of mounting a box unit in an opening in a wall, the box unit including a box unit body, a first flange located generally toward the front of the box unit body, and a flange member system including at least one flange member having a first side and a second side joined by a base, comprising the following steps:
   a. positioning each flange member with its first side behind the wall, its second side in front of the wall, and its base generally along the edge of the opening in the wall
   b. positioning the box unit body within the opening in the wall; and
   c. connecting the first flange to the flange member system to anchor the box unit to the wall.

* * * * *